United States Patent [19]
Owens

[11] Patent Number: 5,644,394
[45] Date of Patent: Jul. 1, 1997

[54] SYSTEM FOR REPAIRING DAMAGED GAS TURBINE ENGINE AIRFOILS

[75] Inventor: James L. Owens, Colchester, Conn.

[73] Assignee: United Technologies Corporation, Hartford, Conn.

[21] Appl. No.: 325,736

[22] Filed: Oct. 19, 1994

[51] Int. Cl.[6] .................................................. G01N 21/00
[52] U.S. Cl. ........................... 356/241; 15/324; 15/339
[58] Field of Search ........................... 356/241; 359/362, 359/363; 15/339, 414, 324, 415.1, 304

[56] References Cited

U.S. PATENT DOCUMENTS

| | | | |
|---|---|---|---|
| 3,590,232 | 6/1971 | Sadowski | 240/2 |
| 3,614,414 | 10/1971 | Gores | 240/2 |
| 3,778,170 | 12/1973 | Howell et al. | 356/241 |
| 4,080,737 | 3/1978 | Fleer | 32/22 |
| 4,184,175 | 1/1980 | Mullane, Jr. | 358/93 |
| 4,498,868 | 2/1985 | Schuss | 433/29 |
| 4,553,938 | 11/1985 | Olsen | 433/126 |
| 4,723,911 | 2/1988 | Kurtz | 433/27 |
| 4,793,326 | 12/1988 | Shishido | 356/241 |
| 4,975,058 | 12/1990 | Woodward | 433/126 |
| 4,992,047 | 2/1991 | Warner | 433/91 |
| 5,049,070 | 9/1991 | Ademovic | 433/29 |
| 5,051,823 | 9/1991 | Cooper | 358/98 |
| 5,052,803 | 10/1991 | Krauter | 356/241 |
| 5,155,941 | 10/1992 | Takahashi et al. | 51/165.72 |
| 5,178,536 | 1/1993 | Werly | 433/29 |
| 5,251,025 | 10/1993 | Cooper | 358/98 |
| 5,281,134 | 1/1994 | Schultz | 433/29 |
| 5,290,168 | 3/1994 | Cooper | 433/29 |
| 5,301,061 | 4/1994 | Nakada et al. | 359/362 |
| 5,311,639 | 5/1994 | Boshier | 356/241 |
| 5,349,940 | 9/1994 | Takahashi et al. | 356/241 |
| 5,475,485 | 12/1995 | Diener | 356/241 |

FOREIGN PATENT DOCUMENTS 0602397 11/1993 European Pat. Off. .

Primary Examiner—Hoa Q. Pham
Attorney, Agent, or Firm—Marina F. Cunningham

[57] ABSTRACT

A system for repairing damaged airfoils for gas turbine engines includes a plurality of rigid attachment tools. Each attachment tool is individually shaped to access a leading edge of the damaged airfoil of a particular stage of the gas turbine engine. The attachment tools enable repair of the damaged airfoils without disassembling of the gas turbine engine.

9 Claims, 4 Drawing Sheets

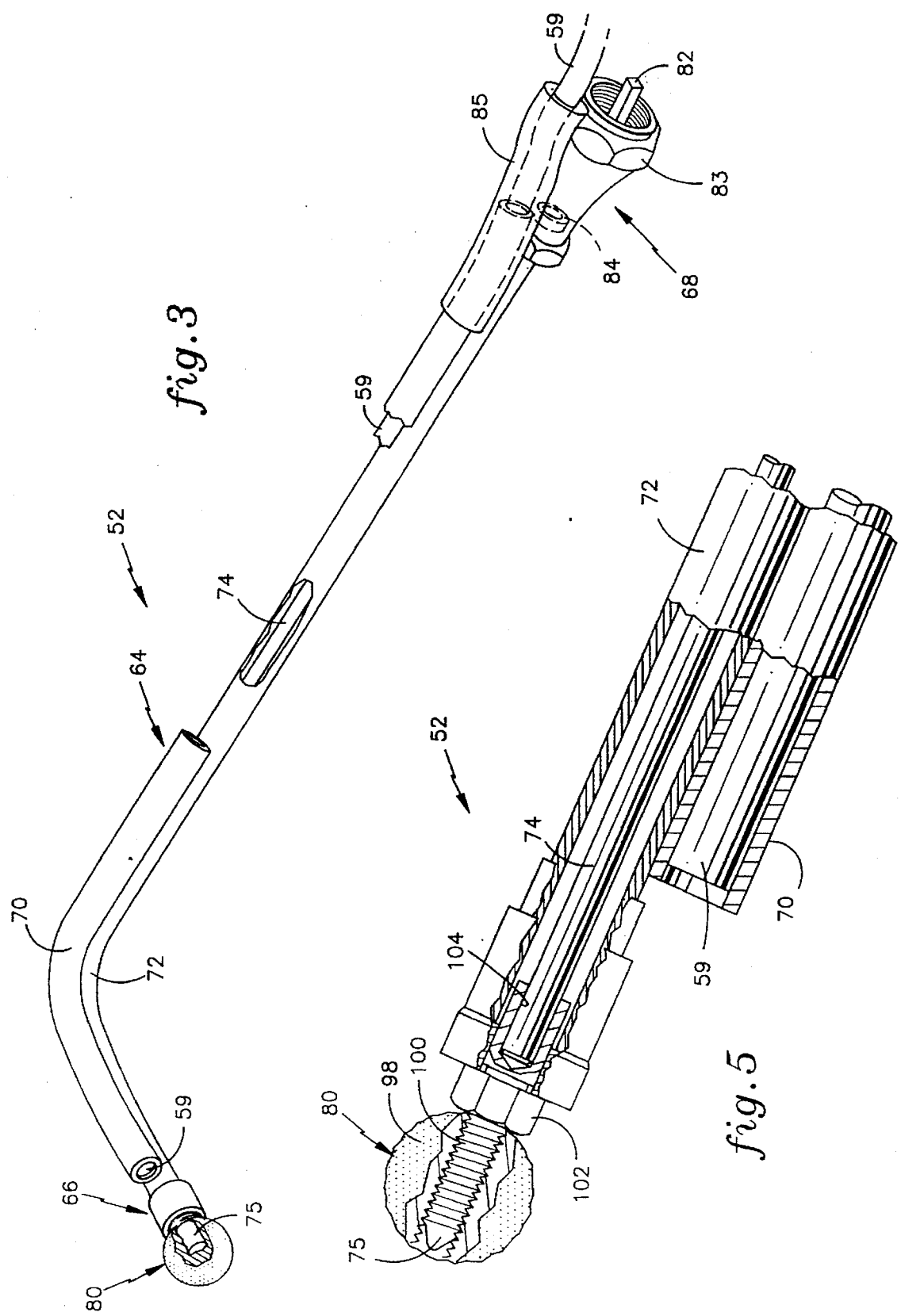

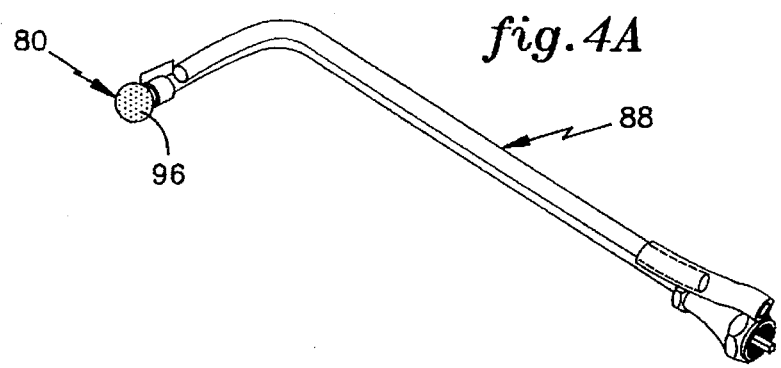
*fig.4A*
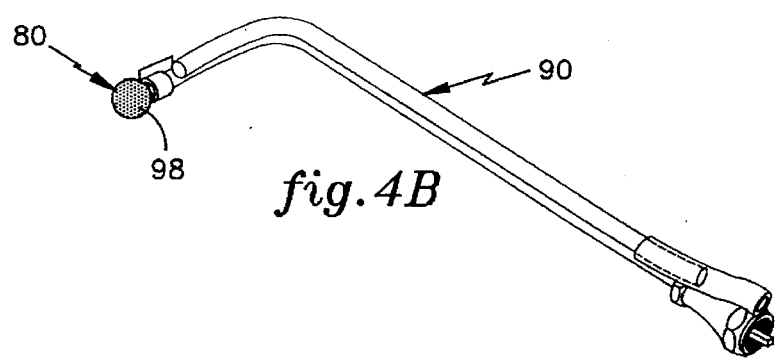
*fig.4B*
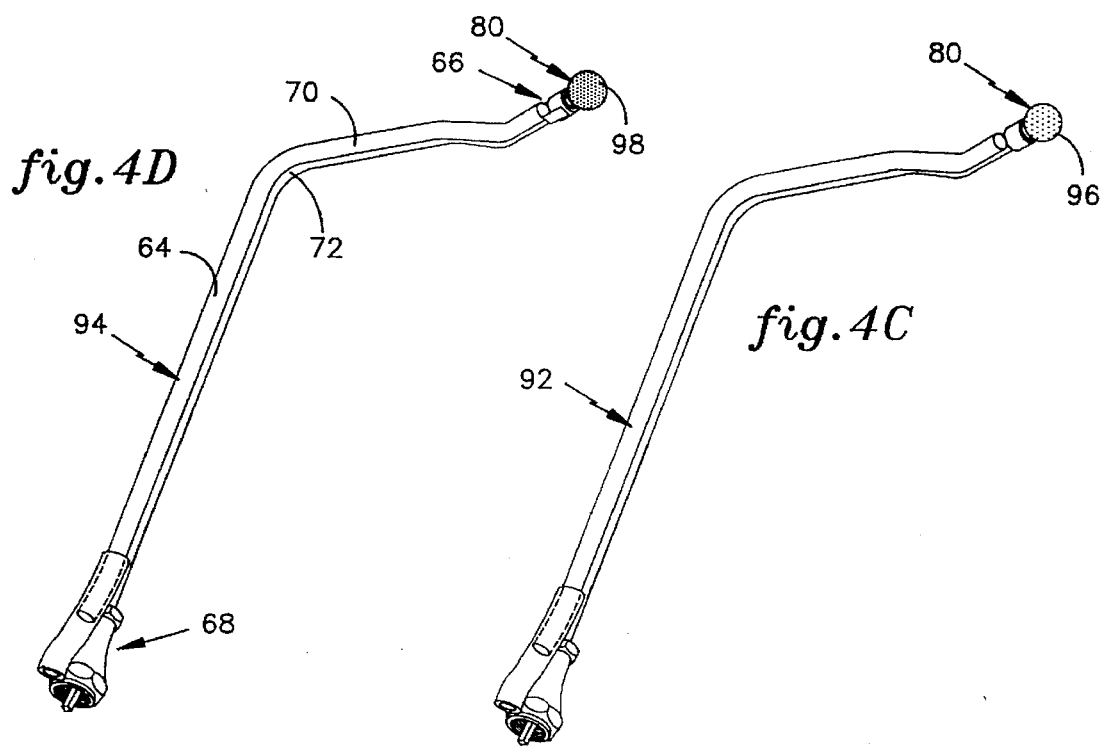
*fig.4D*
*fig.4C*

SYSTEM FOR REPAIRING DAMAGED GAS TURBINE ENGINE AIRFOILS

TECHNICAL FIELD

This invention relates to gas turbine engines and, more particularly, to a system for repairing damage on gas turbine engine airfoils.

BACKGROUND OF THE INVENTION

Conventional gas turbine engines are enclosed in an engine case and include a compressor, combustor, and a turbine. Air flows axially through the sections of the engine. As is well known in the art, air, compressed in the compressor, is mixed with fuel which is burned in the combustor and expanded in the turbine, thereby rotating the turbine and driving the compressor.

Most compressors include a fan, a low pressure compressor, and a high pressure compressor disposed about a longitudinal axis of the engine with the low pressure compressor rotating at lower speeds than the high pressure compressor. Both, the low pressure compressor and the high pressure compressor, as well as the turbine, comprise alternating stages of rotating airfoils, or blades, and stationary airfoils, or vanes.

The gas turbine engines mounted on a wing of an aircraft are frequently damaged by foreign objects, such as sand particles or stones, ingested by the engine during takeoff. The foreign objects ingested by the engine often cause nicks or chips on impact with the compressor airfoils. Most damage caused by the foreign objects is to the first few stages of the high pressure compressor blades. Furthermore, most damage occurs at the leading edge of each affected blade.

It is necessary to detect damage and then replace or repair blades when damage exceeds industry acceptable limits. The detection process involves a visual inspection of each blade through a borescope. The borescope, a fiber optic cable connected to a light source, is inserted through borescope openings within the engine case and into the engine. The small borescope openings are disposed throughout the engine case at most stages of the high pressure compressor for such borescope inspections.

In accordance with certain prior art inspection techniques, once a blade having excessive damage is observed, the engine must be removed from the wing of the aircraft. Subsequently, the engine has to be disassembled to expose the damaged blade. Only then, can the blade be accessed and either repaired or replaced. This procedure is time consuming and extremely expensive. The cost of removing, disassembling, repairing and reassembling the engine is between $250,000 and $500,000.

The industry has found a more practical solution to repair gas turbine engine airfoils. Machida, Inc. of Orangeburg, N.Y. sells a Power Blending Borescope Kit for JT8D-200 engine, manufactured by the Pratt & Whitney Division of United Technologies Corporation of Hartford, Conn., the assignee of the present invention. The Power Blending Borescope Kit, developed jointly by Pratt & Whitney and Machida, Inc., detects and repairs (i.e. blends) foreign object damage on the seventh stage compressor blades of JT8D-200 series engine. The kit includes a grinding tip connected to a drive cable that passes through a working channel of a flexible borescope. The working channel is flexible to the extent that it is capable of being bent by a wire. After the flexible working channel in a straight position is inserted into the engine through the seventh stage borescope opening, a knob is turned to activate the wire to bend the flexible channel for accessing the leading edge of the seventh stage blade at a substantially right angle. The grinding tip must be positioned at a substantially right angle to the leading edge of the blade during the blending process so that the blended edge of the airfoil is blunt. If the grinding tip accesses the leading edge at an angle other than a substantially right, the resulting blended edge will be a sharp edge, which is unacceptable for operation of the gas turbine engine. Subsequent to proper positioning of the grinding tip, a drive motor, connected to the drive cable, operates the grinding tip to blend the damaged area of the blade. A technician operating the kit views the damaged airfoil and the process of repairing the airfoil on a monitor.

Although this system eliminates the need to remove and disassemble the engine, it has a number of limitations. One major drawback is that this blending tool can access only certain stages of certain engine models. The first underlying reason for this blending tool not being capable of accessing the leading edge of the blade is that newer engines have more intricate passageways between the borescope opening and the leading edge of the blade. In order to reach the leading edge of the blades of certain stages, the flexible channel must have multiple bends. The current construction cannot have more than one bend and has limitations on certain angles since the bending motion of the flexible working channel is motor driven and bending in more than one direction is not possible. The second underlying reason for this blending tool not being capable of accessing the leading edge of the blade is that on some newer engines, such as the PW4084 manufactured by Pratt & Whitney, different stages of the high pressure compressor have varying distances between the borescope openings and the blades. The existing tool cannot be adapted to have a retractable and extendible grinding tip to compensate for the varying length of the passageways of the newer engines.

Another shortcoming of the above described tool is that once the grinding tip comes into contact with a sharp burr, the tool tends to vibrate and travel away from the damaged area. The flexible channel cannot transmit enough force from the operator to maintain the grinding tip in close, accurate contact with the damaged area of the blade.

A further drawback of the above described tool is that the grinding tip is removable. After the grinding is completed, a polishing tip replaces the grinding tip. If the grinding tip is not tightened sufficiently and falls into the engine, the engine may have to be removed from the wing and disassembled to retrieve the grinding tip, a complicated and, as noted above, an expensive procedure. Thus, there is still a need for a blending tool for modern gas turbine engines that does not require removal of the engines from the airplane and allows proper access to the high pressure compressor blades at all necessary stages thereof.

DISCLOSURE OF THE INVENTION

According to the present invention, a system for accessing and repairing damaged airfoils in a plurality of stages of a gas turbine engine includes a plurality of rigid attachment tools individually shaped and conforming to a path between a borescope opening of a particular stage and the leading edge of the blade of that stage to access the damaged airfoils at each successive stage of the gas turbine engine at a substantially right angle. The plurality of attachment tools includes a blending attachment tool and a polishing attachment tool for each stage of the gas turbine engine that requires repair. Each attachment tool has a rigid elongated body with a working end and an attachment end. A borescope and a drive cable extend through the elongated body of the attachment tool and protrude through the working end thereof. The working end of each attachment tool includes an abrasive tip driven by a drive motor, connected to the drive cable. The abrasive tip of the polishing attachment tool is a polishing tip removably attached to the drive cable. The abrasive tip of the blending tool is a blending tip fixedly attached onto the drive cable.

The system further comprises a high intensity light to provide lighting through the borescope onto the damaged airfoil and a camera to transmit through the borescope the image of the damaged blade onto a video monitor.

The system enables an operator to access airfoils of successive stages of the gas turbine engine to detect and repair the damage to the airfoils without removing the gas turbine engine from the aircraft wing and without disassembling the engine. The rigid shape of each attachment tool is specially tailored to access a corresponding specific stage of the gas turbine engine, thereby, providing access to all stages of airfoils that must be repaired. The rigid elongated body allows some attachment tools to have multiple bends that allow access at substantially right angles to airfoils of all of the stages.

One advantage of the present invention is that the rigid attachment tool is capable of transmitting sufficient force to the grinding tip to maintain the grinding tip in close, accurate contact with the damaged area of the airfoil and prevent the grinding tip from vibrating away therefrom. Another advantage of the present invention is that the grinding tip is not removable, thereby significantly reducing the possibility of the grinding tip separating and falling into the gas turbine engine and thus, necessitating removal of the entire gas turbine engine and disassembly thereof.

The foregoing and other objects and advantages of the present invention become more apparent in light of the following detailed description of the exemplary embodiments thereof, as illustrated in the accompanying drawings.

BRIEF DESCRIPTION OF THE DRAWINGS

FIG. 3 is an enlarged, sectioned elevation of a blending attachment tool of the system shown in FIG. 2.;

FIG. 4A is an enlarged perspective view of a blending attachment tool for the sixth and seventh stage blades of the engine shown in FIG. 2, according to the present invention;

FIG. 4B is an enlarged perspective view of a polishing attachment tool for the sixth and seventh stage blades of the engine shown in FIG. 2;

FIG. 4C is an enlarged perspective view of a blending attachment tool for the fifth stage blades of the engine shown in FIG. 2;

FIG. 4D is an enlarged perspective view of a polishing attachment tool for the fifth stage blades of the engine shown in FIG. 2; and FIG. 5 is an enlarged, fragmentary, sectioned elevation of the end of the polishing tools of FIGS. 4B and 4D.

BEST MODE FOR CARRYING OUT THE INVENTION

Figure 1:
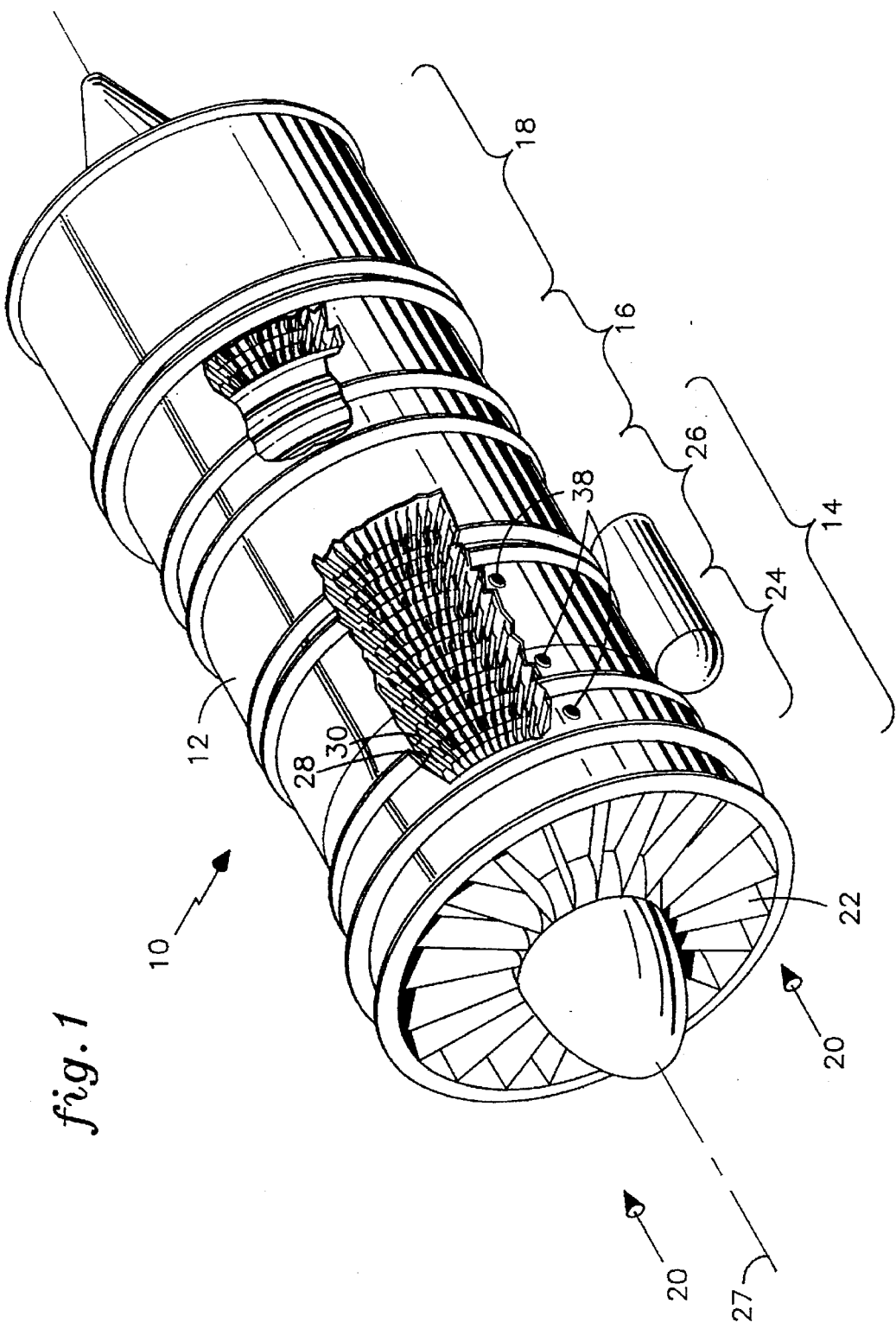
FIG. 1 is a simplified, isometric view of a typical gas turbine engine with portions of the case thereof broken away to show details of the invention of the engine.

Referring to FIG. 1, a conventional gas turbine engine 10 is enclosed in an engine case 12 and includes a compressor 14, a combustor 16, and a turbine 18. Air 20 flows axially through the sections 14, 16, 18 of the engine 10. As is well known in the art, the air 20, compressed in the compressor 14 is mixed with fuel which is burned in the compressor 14 and expanded in the turbine 18, thereby rotating the turbine 18 and driving the compressor 14.

Figure 2:
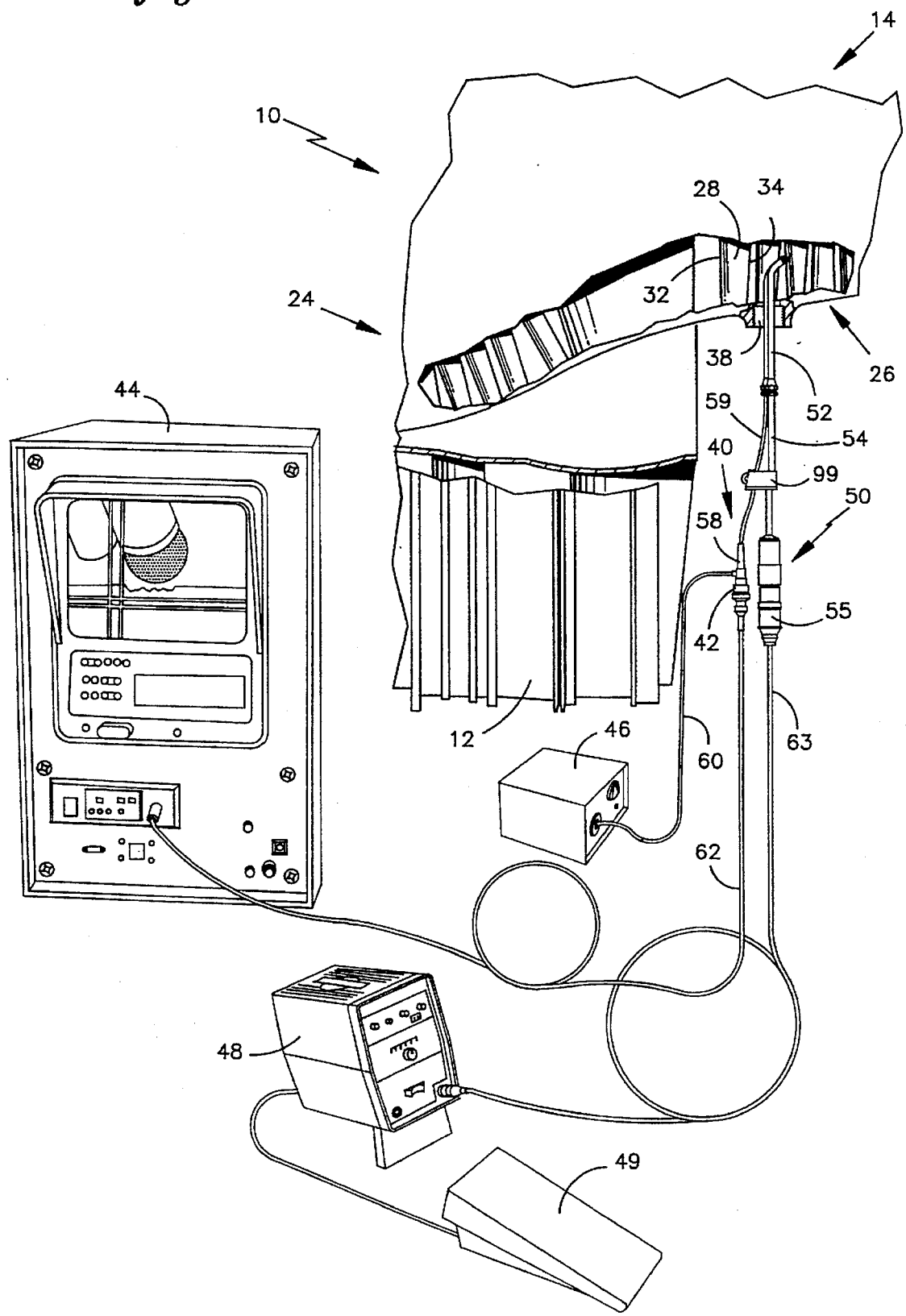
FIG. 2 is a fragmentary elevation of a gas turbine engine and a simplified representation of a system for detecting and repairing damaged airfoils of that engine according to the present invention.

The compressor 14 includes a fan 22, a low pressure compressor 24, and a high pressure compressor 26 disposed about a longitudinal axis 27 with the low pressure compressor 24 rotating at lower speeds than the high pressure compressor 26. Both, the low pressure compressor 24 and the high pressure compressor 26 comprise alternating stages of rotating airfoils, or blades, 28 and stationary airfoils, or vanes, 30. Each airfoil includes a leading edge 32 and a trailing edge 34, as can be seen in FIG. 2. The engine case 12 includes a plurality of borescope openings 38, which are located at most stages of the compressor 14 to allow access to that stage of the compressor airfoils 28 for inspection and repair thereof.

Referring to FIG. 2, equipment for detecting and repairing damaged airfoils 28 for an engine such as a PW4000 series engine, manufactured by Pratt & Whitney, includes a borescope 40 with a camera 42, a video monitor 44, a high intensity light source 46, a motor control unit 48 with a pedal 49, a motorized power handle 50 and a rigid attachment tool 52. The rigid attachment tool 52 is one of the plurality of rigid attachment tools, shown in FIGS. 4A–4D, that can be attached onto the power handle 50 which includes a rigid motor shaft 54 and a drive motor 55. The borescope 40 comprises a borescope body 58, formed integrally with the camera 42, and a flexible fiber optic bundle 59 extending therefrom. The optic bundle 59 provides light to the blade and transmits the image of the blade to the camera 42. The borescope 40 and the high intensity light source 46 are connected by a light guide 60 that provides high intensity light to the borescope 40 to be transmitted through the fiber optic bundle 59 to the blade. A camera cable 62 connects the camera 42 with the video monitor 44 to transmit the image of the blade from the camera to the monitor 44. The drive motor 55 is connected to the motor control unit 48 by an electric power cable 63.

Referring to FIG. 3, each attachment tool 52 comprises an elongated body 64 with a working end 66 and an attachment end 68. The elongated body 64 comprises two rigid channels, a borescope channel 70 and a motor channel 72, having generally the same shape and fixedly attached to each other. The motor channel 72 accommodates a flexible drive cable 74 extending from the attachment end 68 to the working end 66 thereof. The drive cable 74 protrudes through the working end 66 of the motor channel 72 terminating in a mounting tip 75. An abrasive tip 80 is fixedly attached onto the mounting tip 75 of the drive cable 74. The drive cable 74 attaches to a drive shaft 82 at the attachment end 68 with the drive shaft 82 protruding from the attachment end 68 of the motor channel 72.

The attachment end 68 of the motor channel 72 rigidly attaches to the rigid motor shaft 54 of the power handle 50 by means of an attachment connector 83 wherein the drive shaft 82 makes connection with the motor shaft 54 to transmit the motion from the drive motor 55 to the abrasive tip 80 as shown in FIG. 2. A plurality of beatings 84 are pressfit onto the drive cable 74 and in turn pressfit into the motor channel 72 to provide rigid support for the drive cable 74 within the motor channel 72.

The borescope channel 70 is slightly shorter than the motor channel 72 on the working end 66 thereof and accommodates the fiber optic bundle 59 therein. Plastic tubing 85 is placed over the attachment end 68 of the borescope channel 70 to prevent the fiber optic bundle 59 from rubbing against sharp edges of the borescope channel 70.

Referring to FIGS. 4A–4D, the plurality of attachment tools includes a blending attachment tool 88 and a polishing attachment tool 90 for the sixth and seventh stage of a Pratt & Whitney PW4000 Engine and a blending attachment tool 92 and a polishing attachment tool 94 for the fifth stage of the same engine. Each attachment tool 88, 90, 92, 94 has a generally analogous construction to the attachment tool 52 as described above and shown in FIG. 3. The elongated body 64 of the blending attachment tool 88 and the polishing attachment tool 90 has an identical shape. The abrasive tip 80 of the blending tool 88 is a grinding tip 96. The abrasive tip 80 of the polishing tool 90 is the polishing tip 98.

The blending tool 92 and the polishing tool 94 for the fifth stage blades have construction generally similar to the blending tool 88 and the polishing tool 90 for the sixth and seventh stage blades, with the exception of the specific shape of the elongated body 64. The shape of the elongated body of the polishing tool 94 and the blending tool 92 for the fifth stage blades is identical to each other and is tailored to access the fifth stage of the blades. This particular shape with multiple bends of the elongated body 64 of the polishing tool 92 and the blending tool 94 allows access at a substantially right angle to the leading edge 32 of the fifth stage airfoil by properly maneuvering the blending and polishing tools 92, 94. The first step is to position the attachment end 68 of the blending tool 94 in 11:00 o'clock position in front of the fifth stage borescope opening. The next step is to insert the working end 66 of the blending tool 94 into the fifth stage borescope opening and rotate the tool so that the grinding tip 98 is facing the front of the engine. Subsequently, the attachment end 68 of the blending tool 94 is pivoted toward the rear of the engine to place the grinding tip 98 at a substantially right angle to the leading edge of the blade.

Once the grinding tip is properly positioned on the blade, the blending tool 92 is rigidly attached onto the rigid motor shaft 54 of the power handle 50, as shown in FIG. 2. The attachment connector 83 is screwed onto the threaded end of the motor shaft 54 with the drive shaft 82 making a connection with the motor shaft 54. The high intensity light source 46 through the light guide 60 transmits high intensity light through the borescope 40 illuminating the subject airfoil 28. The light intensity can be varied. The camera cable 62, the borescope 40, and the camera 42 allow the image of the subject airfoil 28 to be observed on the video monitor 44. The tool is further adjusted on the leading edge of the blade until damage is observed on the screen of the monitor. The speed of the drive motor 50 can be varied by adjusting the motor control unit 48. Maximum speed of the drive motor 50 generally should not exceed 4,000 rpm. The drive motor 50 transmits the motion through the rigid shaft 54 connected to the drive shaft 82 and the drive cable 74 to the grinding tip 96 to blend the damaged area as the operator observes the progress on the monitor 44. Once the burr or nick on the damaged blade is smoothed over, the blending tool 94 is withdrawn from the engine 10 by the operator and removed from the drive motor 50. The polishing tool 94 for the fifth stage airfoil 28 then replaces the blending tool 94 and an analogous polishing procedure is performed. The borescope body 58 and the power handle 50 serve as handles for the operator to hold on to. A bracket 99 may be used to provide more stability during blending and polishing procedures.

The individual rigid attachment tools 88, 90, 92, 94 enable detection and repair of airfoils 28 without removal of the gas turbine engine 10 from the airplane wing. Moreover, the attachment tools 92, 94 allow access to the fifth stage blades that were not previously accessible. The shape of the rigid elongated body 64 is specially tailored to conform to a path from a borescope opening of a particular successive stage to the leading edge of the airfoils of that successive stage and can include multiple bends to access blades of different stages at substantially right angles. Also, the rigid attachment tools allow better control of the grinding tip 96 by transmitting sufficient force thereon and by reducing the tendency of the grinding tip to vibrate and travel away from the damaged area. The present invention concept of having a plurality of rigid attachment tools individually shaped to access a specific stage of a gas turbine engine can be implemented in other engine models as well, not only in PW4000 engine.

The drive cable 74 is manufactured from a flexible metal cable that transmits torque from the drive motor 55 to the grinding tip 96. Any type of a diamond ball can be used as the grinding tip 96. The grinding tip 96 can be either epoxied or silver soldered onto the mounting tip 75 of the drive cable 74. This type of permanent attachment will reduce the likelihood of the grinding tip 96 separating from the mounting tip 75 and falling into the engine, thereby reducing a necessity of engine disassembly to retrieve the grinding tip 96 therefrom. The mounting tip 75 depicted in FIG. 5 for the polishing tools 90, 94 includes a threaded stud 100 having a hex head 102 with a receiving aperture 104 for the drive cable 74 to fit therein. The polishing tip 98 is screwed onto the mounting tip 75 for ease in replacement. The polishing tip 98 is relatively soft and will not cause any damage to the blades, even if it falls into the engine. One type of material that can be used for the polishing tip 98 is Cratex™, manufactured by Cratex Manufacturing Company of San Diego, Calif. The polishing tip is manufactured by the USTEST Company of Glastonbury, Conn. The polishing tip can be also fabricated from other similar types of material. The borescope 40, as well as the video monitor 44, are of the type manufactured by Machida, Inc.

Although the invention has been shown and described with respect to exemplary embodiments thereof, it should be understood by those skilled in the art that various changes, omissions, and additions may be made thereto, without departing from the spirit and scope of the invention.

I claim:

1. A system for observing and repairing damaged airfoils in successive stages of a gas turbine engine, each said airfoil having a leading edge and a trailing edge, said gas turbine engine having an engine case with a plurality of successive borescope openings disposed at each said successive stage thereof for fitting a borescope therethrough, each said successive stage having a path from said borescope opening of said stage to said leading edge of said airfoil of said successive stage to define a plurality of successive paths, each said successive path having an individual shape, said system comprising a high intensity light source for providing high intensity light to a fiber optic bundle of said borescope that projects said high intensity light onto said damaged airfoil, a camera integral with said borescope for transmitting the image of said damaged airfoil through said fiber optic bundle of said borescope onto a video monitor for the user to observe the repair process, and a motorized power handle having a motor shaft and a drive motor with a drive cable protruding from said motor shaft, the improvement characterized by:

a plurality of rigid attachment tools each having a rigid elongated body extending from a working end to an attachment end, each said attachment tool conforming in shape to each said successive path from said borescope opening to said leading edge of said airfoil of said successive stage of said gas turbine engine, said attachment end of said attachment tool attaching onto said motor shaft of said motorized power handle of said system for blending and polishing said damaged airfoil.

2. The system according to claim 1, further characterized by said drive cable and said fiber optic bundle passing through said elongated body of said attachment tool from said attachment end to said working end thereof and protruding from said working end thereof, an abrasive tip being disposed on said working end of said attachment tool with said drive motor transmitting rotating motion to said abrasive tip through said motor shaft and said drive cable.

3. The system according to claim 2, further characterized by said elongated body of said attachment tool having a borescope channel for having said fiber optic bundle of said borescope pass therethrough and a motor channel for having said drive cable pass therethrough.

4. The system according to claim 2, further characterized by said plurality of rigid attachment tools including a blending attachment tool and a polishing attachment tool for each said successive stage of said gas turbine engine, said blending attachment tool and said polishing attachment tool having generally same individual shape to access and repair said stage of said gas turbine engine.

5. The system according to claim 4, further characterized by said abrasive tip of said blending attachment tool being a grinding tip.

6. The system according to claim 5, further characterized by said grinding tip fixedly attaching to said drive cable by means of epoxy.

7. The system according to claim 4, further characterized by said abrasive tip of said polishing attachment tool being a polishing tip.

8. The system according to claim 7, further characterized by said polishing tip fixedly screwing onto said drive cable.

9. A method for observing and repairing damaged airfoils in successive stages of a gas turbine engine, said gas turbine engine having a front and a rear, said method comprising the steps of:

positioning a rigid blending tool having an elongated body with an attachment end and a working end in front of a borescope opening formed in an engine case at a corresponding stage of said gas turbine engine with said attachment end of said blending tool pointing toward 11:00 o'clock position, said rigid blending tool conforming in shape to a path from said borescope opening to a leading edge of said damaged airfoil of said corresponding stage of said gas turbine engine;

inserting said working end of said blending tool radially inward through said borescope opening;

rotating said blending tool so that a grinding top disposed on said working end of said blending tool being oriented to face the front of said gas turbine engine;

pivoting said attachment end of said blending tool toward the rear of said gas turbine engine;

securing said attachment end of said rigid blending tool onto a motorized power handle;

inserting a fiber optic bundle of a borescope through said rigid elongated body of said blending tool with said fiber optic bundle protruding through said working end of said rigid blending tool;

connecting said borescope to said high intensity light source to provide high intensity lighting through said fiber optic bundle onto said damaged airfoil;

connecting said borescope to a video monitor to observe repair process of said airfoil transmitted through said fiber optic bundle of said borescope and a camera of said borescope onto said video monitor;

positioning said grinding tip of said blending tool at a substantially right angle to said leading edge of said damaged airfoil while observing said grinding tip and damaged airfoil on said video monitor;

turning on said motorized power handle after the damage is blended;

withdrawing said rigid blending tool from said gas turbine engine by maneuvering said rigid tool;

withdrawing said rigid blending tool from said borescope opening;

removing said rigid blending tool from said motorized power handle;

repeating above steps with a rigid polishing tool to polish said damaged blade, said polishing tool conforming in shape to said path from said borescope opening to said leading edge of said damaged airfoil of said corresponding stage of said gas turbine engine; and selecting a different blending tool of a different shape conforming in shape from a borescope opening to a successive stage of said gas turbine engine and repeating the above steps and applied to said successive stage of said gas turbine engine.

* * * * *